United States Patent
Gottesman et al.

(10) Patent No.: US 6,909,429 B2
(45) Date of Patent: Jun. 21, 2005

(54) SYSTEM AND METHOD FOR DISPLAYING CONTENT IN A THREE-DIMENSIONAL VIRTUAL ENVIRONMENT

(75) Inventors: Asaf Gottesman, Kfar Shmaryaho (IL); Udi Bobrovsky, Kiryat Netafim (IL)

(73) Assignee: A.G. Imaginations Ltd., Floriana (MT)

( * ) Notice: Subject to any disclaimer, the term of this patent is extended or adjusted under 35 U.S.C. 154(b) by 159 days.

(21) Appl. No.: 09/859,376

(22) Filed: May 18, 2001

(65) Prior Publication Data

US 2002/0171642 A1 Nov. 21, 2002

(51) Int. Cl.$^7$ .............................................. G05T 15/00
(52) U.S. Cl. ..................... 345/419; 345/355; 345/848; 345/850
(58) Field of Search ................................ 345/419, 848, 345/850, 420, 757, 427, 355

(56) References Cited

U.S. PATENT DOCUMENTS

| 5,883,628 A | * | 3/1999 | Mullaly et al. | 345/850 |
| 5,923,330 A | * | 7/1999 | Tarlton et al. | 345/419 |
| 6,343,936 B1 | * | 2/2002 | Kaufman et al. | 434/262 |

* cited by examiner

*Primary Examiner*—Kimbinh T. Nguyen
(74) *Attorney, Agent, or Firm*—Eitan, Pearl, Latzer & Cohen Zedek, LLP

(57) ABSTRACT

Disclosed is a system and method for presenting content within a three-dimensional environment. A data container containing a parameter representing at least a portion of the content is rendered within the environment and a two dimensional prospective view from a view point is produced. The view point is moved along a predefined path and the container's parameter is updated in relation to the position of the view point.

18 Claims, 5 Drawing Sheets

SYSTEM AND METHOD FOR DISPLAYING CONTENT IN A THREE-DIMENSIONAL VIRTUAL ENVIRONMENT

FIELD OF THE INVENTION

The present invention relates to the field of virtual presentation systems. More specifically, the present invention relates to three-dimensional presentations of content with interactive feedback capabilities.

BACKGROUND OF THE INVENTION

Few will argue that the Internet has revolutionized the means and the formats by which human beings communicate today. Specifically, a series of Internet software applications, collectively referred to as the World Wide Web, have brought color, site, sound, and some would even say life to content published on the Internet. The World Wide Web started with a relatively simple interactive search and presentation application called MOSAIC—the world's first web browser. MOSIAC was developed by academics in order to facilitate the sharing of research data located on computer systems at universities around the world. Soon after its development, however, wide spread commercialization of MOSAIC began.

Since MOSIAC's introduction, numerous other web browsers and related software applications have been developed. Whereas MOSIAC presented static content in a two dimensional format, more recent World Wide software applications, such as Flash™ and Real Player™, are capable of accessing and presenting dynamic content such as active containers, streaming audio/video, and various combinations of other multimedia Certain applications have attempted to simulate three dimensional environments over the Internet. For example, some websites allow a visitor to download a software application, commonly referred to as a plug-in, which works in conjunction with the visitor's web browser to simulate a three dimensional environment on the visitors screen. The parameters of the environment (walls, floor, and other containers within the 3-D space) are produced by the site's computer system and several visitors to the site may share and interact within a common environment.

Visitors to web sites providing three-dimensional environments, such as "www.worlds.com", are usually assigned a virtual representative or agent, commonly referred to as an avatar. The visitor's view of the environment is from the perspective of the avatar, and the visitor navigates the three dimensional environment by directing his avatar to move within the virtual 3-D space. The visitor's view of the environment changes in relation to the avatar's change in perspective. Thus, in order for a visitor to change his view of the environment, he must direct his avatar to move. For the most part, the three dimensional environments of the prior art attempts to emulate a real environment with solid containers and fixed dimensions. A visitor is able to interact with other visitors and with containers such as links by causing their avatar to approach the container.

SUMMARY OF THE INVENTION

As part of the present invention there is disclosed a system and method of presenting content in a three-dimensional format. A data container containing one of more parameters representing some portion of the content to be presented is rendered in a virtual three-dimensional environment and assigned a position within the environment. A viewer sees the container from the perspective viewpoint of a virtual agent or avatar traveling along a path through the three-dimensional environment. The container's parameters may be updated as a function of the agent's position. The container's position may also change to create the perception that the container is either traveling towards or away from the viewer's agent. A container may either have persistence, such as a portion of the environment's background, or may be transient, moving in and out of the environment.

One or more of the container's parameters may be an associated function, such that when a user interacts with the container the associated function or functions are initiated or executed. A user may interact wit a container through a variety of input methods. A container's associated function may also be updated and changed as a function of the viewer agent's position within the environment.

BRIEF DESCRIPTION OF THE DRAWINGS

The subject matter regarded as the invention is particularly pointed out and distinctly claimed in the concluding portion of the specification. The invention, however, both as to organization and method of operation, together with containers, features, and advantages thereof, may best be understood by reference to the following detailed description when read with the accompanying drawings in which:

Figure 1:
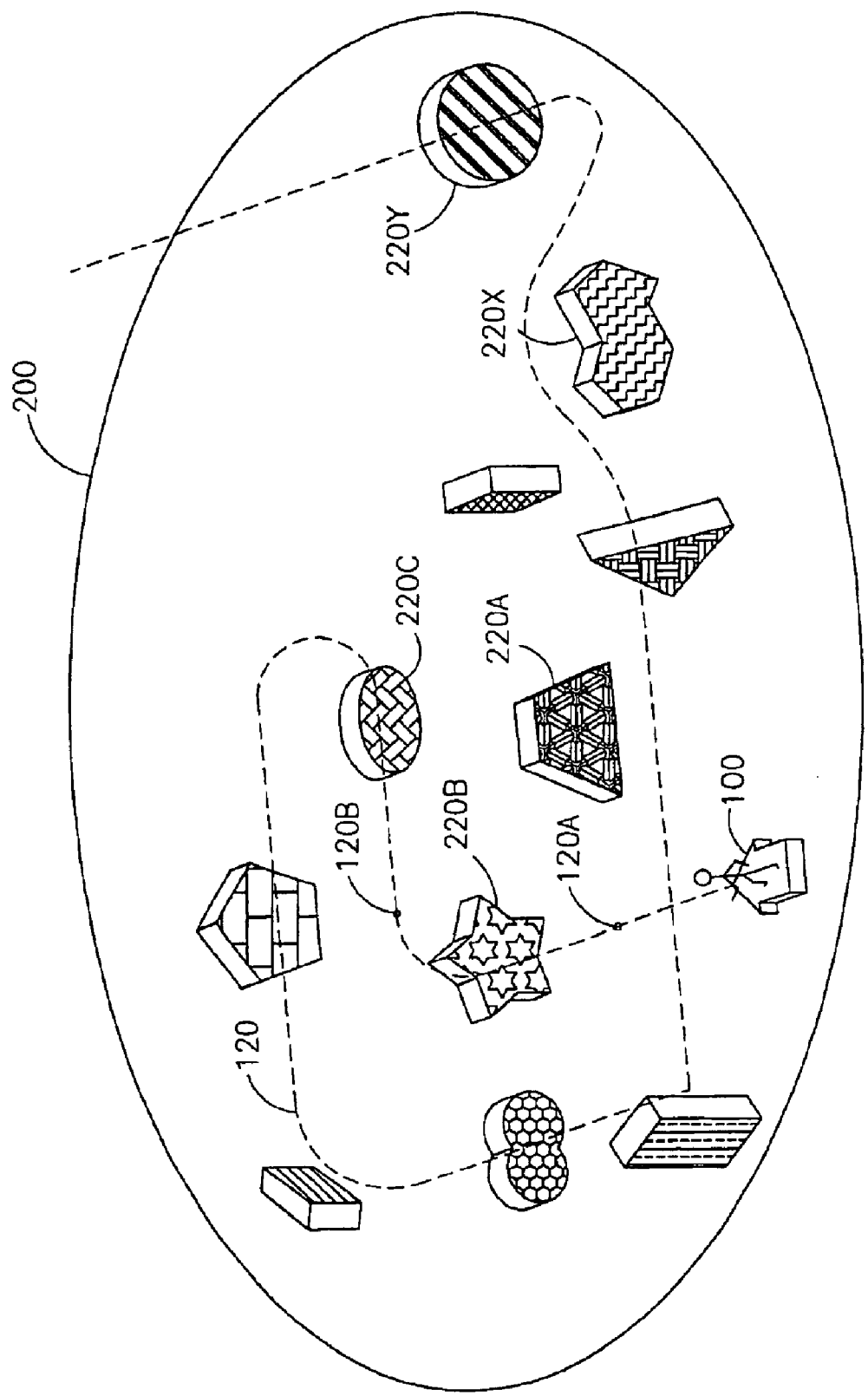
FIG. 1 is a diagram of a virtual three-dimensional environment according to the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

As part of the present invention, a three dimensional environment which may have data containers is tendered by a rendering module. A data container posses no visible or immutable characteristics, but rather may contain one or more display parameters representing at least some portion of content to be presented to a user or viewer. Data containers may also contain one or more associated functions which may be initiated by a user's interaction with the container. Display parameters may include such characteristics as position, size, shape, color, texture, surface appearance or covering, and movement. A container may have a fixed position or may move in and out of the environment. A container may have an associated message or picture which is mapped onto the surface of the container.

The viewer's view of the environment may be produced by a view production module producing a view from the perspective of a virtual agent passing through the environment. As the virtual agent travels through the environment, the viewer's perspective of the environment and of containers contained therein changes accordingly. Furthermore, display parameters and associated functions of one or more of the containers within the environment may change or be updated by an update module. The update module may update the parameters and/or associated functions in relation to a change in the viewer's perspective. That is, associated functions and display parameters such as shape, color or mapped pictures, of one or more of the containers may change as the virtual agent's position in the environment changes. The associated functions and display parameters may be updated with pre-selected parameters stored on a database, or may change according to input received over a distributed data network.

Turing now to FIG. 1, there is shown a diagram of a three-dimensional environment 200 according to the present invention with a virtual agent 100 traveling along a predefined path 120 therein. A viewer sees the environment 200, along with the containers 220 therein, as a two dimensional perspective view from the viewpoint of the virtual agent 100. The virtual agent's 100 predefined path 120 may take the agent around and through containers 220 in the environment 200. As the virtual agent 100 travels through the environment 200, the viewer's perspective view changes along with the agent's 100 viewpoint.

Figure 2:
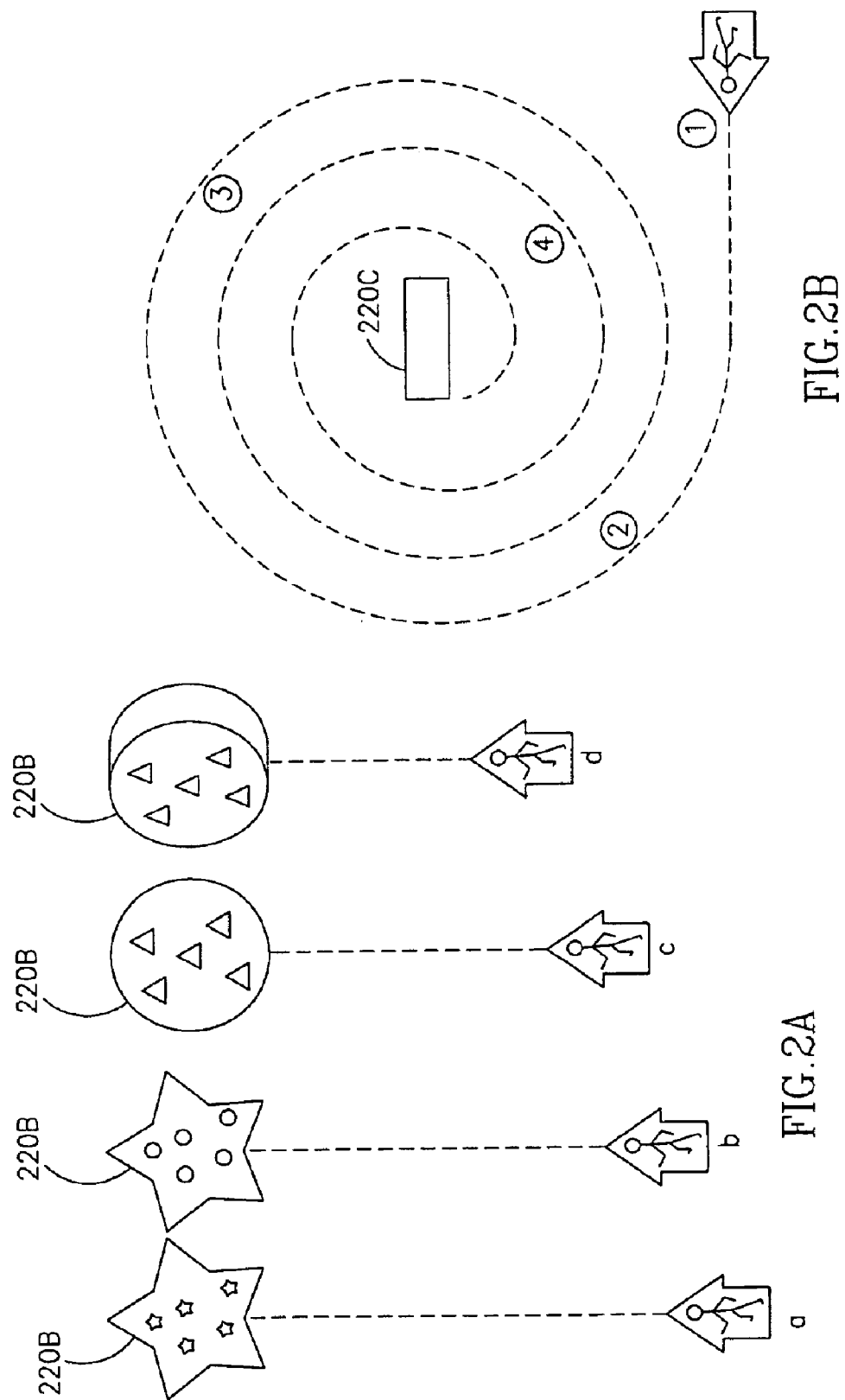
FIG. 2a is a diagram showing display parameters of a data container changing as a function of a virtual agent's position.
FIG. 2b is a diagram showing the points at which display parameters of a data container change as a virtual agent travels along a predefined path.

Turning now to FIG. 2A there is shown a series of diagrams depicting the approach of a virtual agent towards a data container 220B. In FIG. 2A*a,* the agent is a certain distance from the container 220B and the container's display parameters cause the container 220B to appear at a star shaped polygon having star shapes covering its surface. In FIG. 2A*b,* the virtual agent's position is closer to the container 220B and display parameters are changed or updated in order to make the container 220B appear as a star shaped polygon having circle shapes covering its surface. In FIG. 2A*c,* the virtual agent's position is even closer to the container 220B and the display parameters are updated such that the container 220B appears as a circle triangle shapes covering its surface. FIG. 2A*d* shows the virtual agent at yet another position and the data container's display parameters updated to show the container as a rotating circle.

Figure 3:
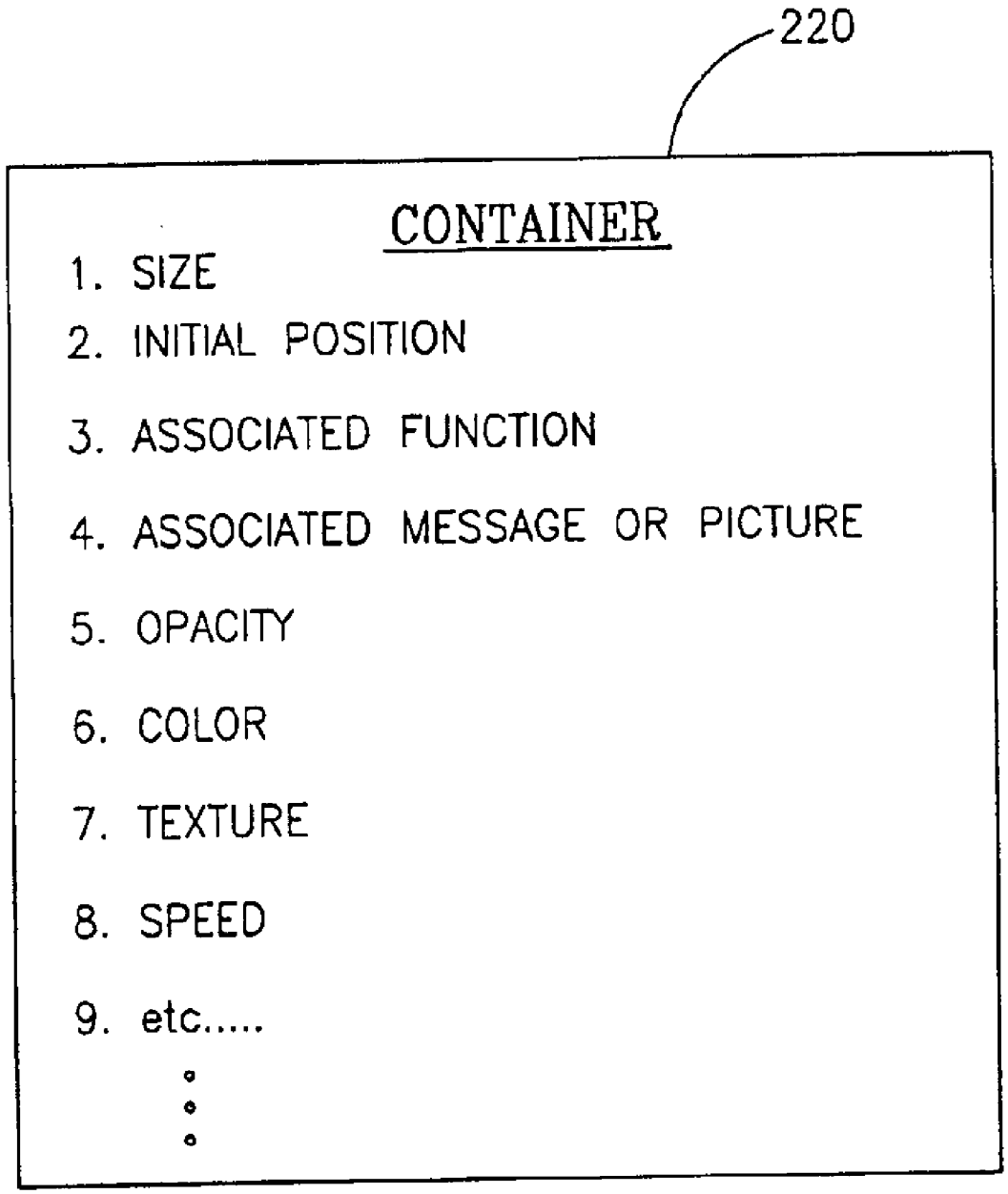
FIG. 3 is a diagram showing a partial lists of parameters data container according to the present invention may contain.

Turning now to FIG. 2B, there is show a diagram depicting a virtual agent traveling a path around a data container 220B. The path is shown by a dashed line, and points along the path where a parameter of the container 220B is updated is marker by a number within a circle. At each of the marker points, a parameter update module may update one or more of the container's 220B parameters, Turning now to FIG. 3, there is shown a block diagram depicting a data container 220 and various parameters which it may contain, including associated functions and one or a series of display parameters. An associated function may be executed or initiated when a viewer interacts with the container 220 to which the function is associated. Interaction with a data container may occur through the use of a mouse pointer, a keyboard, or any other input device. An associated function may be executed when the virtual agent 100 reaches a specific point along the predefined path. One example of an associated function is a hypertext link or URL.

A container 220 is rendered within the environment in accordance with its display parameters. Display parameters may define such characteristics as position, size, shape, color, texture, mapped pictures or other messages, and movement. A container 220 may have a fixed position or may move within the environment. A container 220 having no display parameters may appear transparent within the environment.

As the virtual agent 100 travels along the path 120, one or more of the containers' associated functions and display parameters may be updated. For example, while the virtual agent is at point 120*a* (FIG. 1), container 220*c* may have the shape of a triangle and be covered by a first bit map. As the virtual agent approaches point 120*b,* the display parameters of container 220*c* are updated such that container 220*c* is re-rendered as a square covered by a second bitmap.

Figure 5:
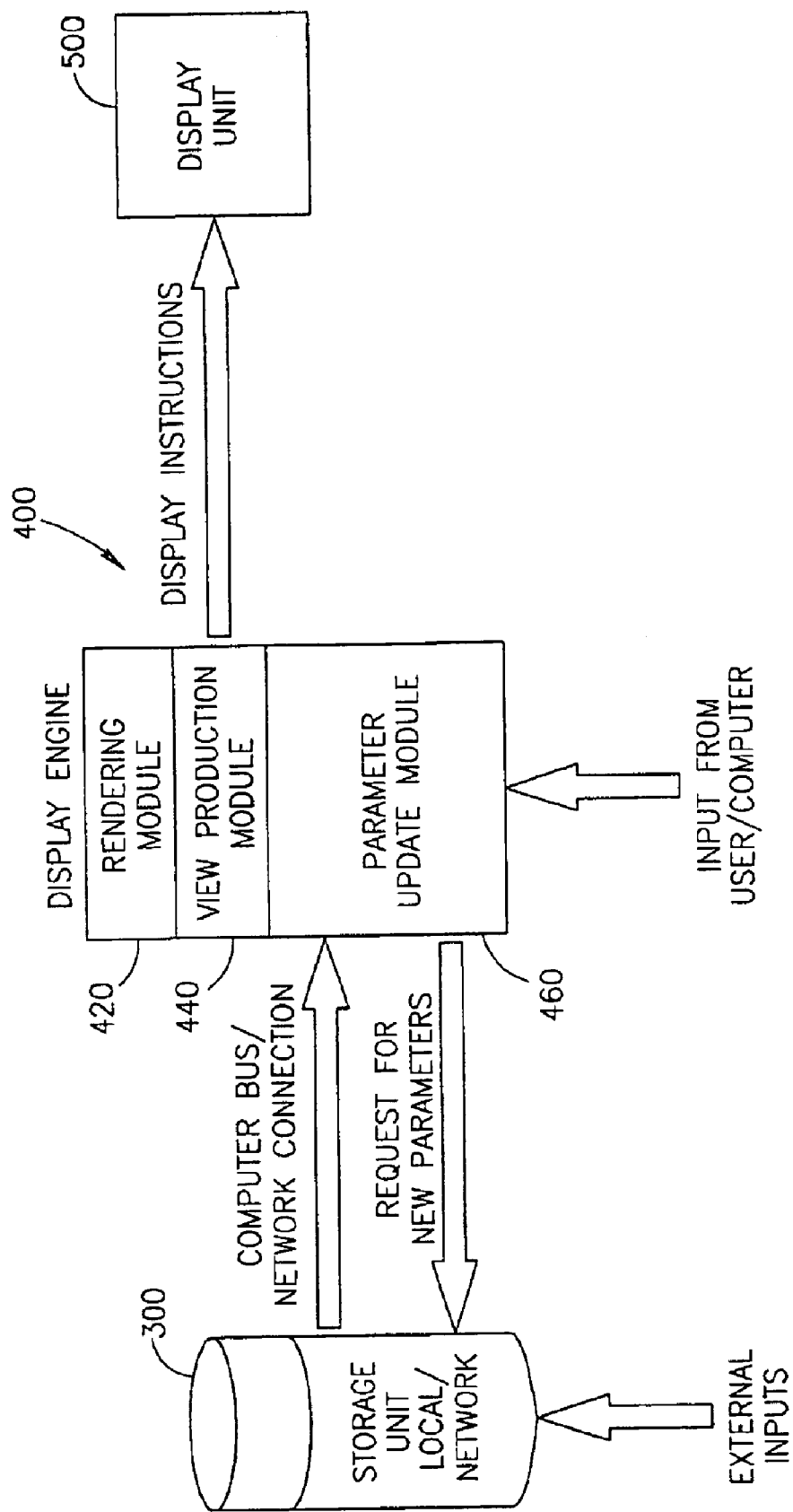
FIG. 5 is a diagram showing a system for implementing a presentation according to the present invention.

Turning now to FIG. 5, there is shown a display engine 400 receiving a data container 220 from a storage unit 300, which storage unit 220 may either reside on the same computer as the display engine or may be connected to the display engine 400 through a network connection. The display engine has a rendering module 420, a view production module 440, and a display parameter update module 460. The rendering module 420 renders the virtual three dimensional environment 200, including the background, floor surfaces, and the containers 220. Rendering of three dimensional environments is well known. Numerous commercially available software products are available and may be used as part of the present invention. In general, a rendering module operates in conjunction with a computer processor to compile a data set or array, or set of arrays of data, in a computer memory, which data represents a three dimensional environment.

A view production module 440, generates a two dimensional image representing a prospective view of the environment 200 from the viewpoint of the virtual agent 100. The view production module 440 may use the data set compiled by the rendering module 420 to generate an image for each point along the path 120. Conversion or mapping of a data set representing a virtual three-dimensional environment into a two dimensional image is well known. Commercially available software such as MatLab or even the well known video game Doom are examples of software having view production modules which may be used as part of the present invention.

Figure 4:
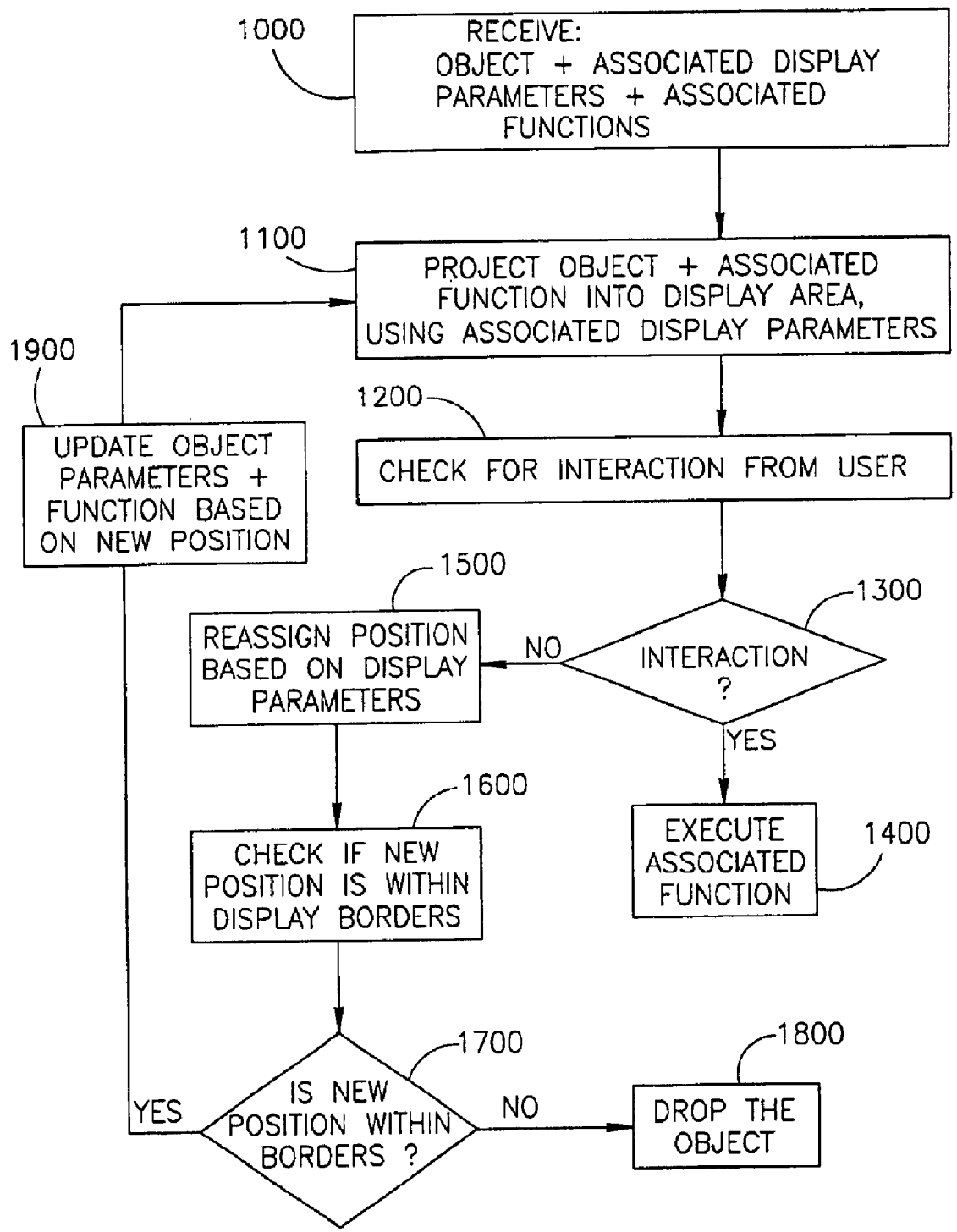
FIG. 4 is a flow diagram showing the steps of a method of producing a presentation according to the present invention.

Turing now to FIG. 4, there is a flow diagram showing steps performed to produce the three dimensional environment 200 of the present invention. In Step 1000, the display engine 400 may receive a data container 220 along with its associated function and associated parameters from storage unit 300. As part of Step 1100, the container may be projected into the environment. The term projected generally means added to the data set representing the environment 200. Interaction by a viewer with a container 220 may be checked for as part of Step 1200, and if an interaction occurs, the container's associated function may be executed as part of Step 1400. Since the virtual agent 100 of the present invention travels along a predefined path, not requiring the viewer to use an input device to control its movement, one or more the computer's pointing devices, such as a mouse, are fee to allow a viewer to point to an click on an container 220. Other input devices such a light pen or a keyboard may also be used to interact with a container 220.

A parameter update module 460 may update or change the display parameters and associated functions of one or more of the containers 220 in response to a change in the viewpoint of the virtual agent 100. A change in a container's display parameters results in the rendering module 420 re-rendering the container 220 in accordance with the new parameters. A further result of updating the parameters is that the view production module 440 may generate an image showing a container 220 in accordance with the new parameters, thus producing a sudden morphing effect. If a container 220 has parameters defining its movement within the environment, during Step 1500, the container's position may be reassigned. As part of Step 1900, a container's display parameters may be updated, and retuning to Step 1100, the container 220, with any possible changes to its position and parameters, may once again be projected into the environment.

The parameter update module 460 may receive new parameters from storage unit 300. The storage unit 300 may contain a static database of parameters, or the storage unit 300 may dynamically receive new parameters from an external source. A new parameter received from an external source may include an image for covering a container 220, which image represents a message such as an advertisement.

Thus, an advertiser, having access to a container's 220 parameter list, may dynamically update any message that container represents.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A system for presenting content in a virtual three-dimensional environment, said system comprised of:
   an environment rendering module receiving a data container adapted to contain a content parameter representing at least a portion of the content, said module adapted to render said container as a function of the content display parameter;
   a view production module producing a two dimensional image correlated to a perspective view of the environment from a view point within the environment;
   a parameter update module adapted to update the content parameter as a function of said view point's position;
   wherein said view point's position changes and moves along a virtual predefined path through the virtual three dimensional environment; and
   wherein said data container changes according to a function associated with said content parameter.

2. The system according to claim 1, wherein said content parameter defines a display feature of said container selected from the group consisting of location, size, shape, texture, skin cover, opacity and movement.

3. The system according to claim 1, wherein said data container further comprises a movement parameter, and wherein said movement parameter is selected from the group consisting of direction, speed, direction of rotation, and rotational velocity.

4. The system according to claim 1, further comprising a parameter database.

5. The system according to claim 4, wherein said update module is adapted to update said data container with parameters stored on said database.

6. The system according to claim 5, wherein said database is partitioned into a plurality of data areas.

7. The system according to claim 6, wherein each data area is adapted to receive a display parameter over a distributed data network.

8. The system according to claim 1, wherein said view point follows a predefined path within the environment.

9. The system according to claim 2, wherein said predefined path intersects with the location of said data container.

10. The system according to claim 9, wherein said view production module is adapted to cause the opacity of said data container to decrease when the view point intersects with the location of said data container.

11. A method of presenting content in a virtual three dimensional environment comprising:
   rendering a data container containing a content parameter representing at least a portion of the content;
   producing a two dimensional image correlated to a perspective view of the environment from a view point within the environment;
   updating a display parameter as a function of the position of the view point, wherein said view point's position changes and moves along a virtual predefined path through the virtual three dimensional environment; and executing a function associated with said display parameter to adjust said content parameter.

12. The method according to claim 11, wherein said content parameter defines a display feature of said container selected from the group consisting of location, size, shape, texture, skin cover, opacity and movement.

13. The method according to claim 12, wherein the movement parameter is selected from the group consisting of direction, speed, direction of rotation, and rotational velocity.

14. The method according to claim 13, further comprising the step of extracting the parameter from a parameter database.

15. The method according to claim 14, further comprising the step of inserting a parameter into the parameter database.

16. The method according to claim 15, further comprising the step of moving the view point along a predefined path within the environment.

17. The method according to claim 16, wherein the view point is moved to a position intersecting a position of the data container.

18. The method according to claim 17, further comprising the step of reducing the opacity of the data container.

* * * * *

UNITED STATES PATENT AND TRADEMARK OFFICE
CERTIFICATE OF CORRECTION

PATENT NO. : 6,909,429 B2  Page 1 of 1
APPLICATION NO. : 09/859376
DATED : June 21, 2005
INVENTOR(S) : Asaf Gottesman et al.

It is certified that error appears in the above-identified patent and that said Letters Patent is hereby corrected as shown below:

In claim 1, column 6, line 15, delete "content" and insert --display--;
line 18, delete "content" and insert --display--;
line 22, delete "content" and insert --display--;
line 28, delete "content" and insert --display--;

In claim 2, column 6, line 29, delete "content" and insert --display--;

In claim 11, column 6, line 59, delete "content" and insert --display--;
column 7, line 2, delete "content parameter" and insert --data container--; and In claim 12, column 7, line 4, delete "content" and insert --display--.

Signed and Sealed this

Thirty-first Day of March, 2009

JOHN DOLL
*Acting Director of the United States Patent and Trademark Office*